May 12, 1936.   V. J. CLIFFORD   2,040,360
LIFEGUARD FOR VEHICLES
Filed Nov. 30, 1934    4 Sheets-Sheet 1
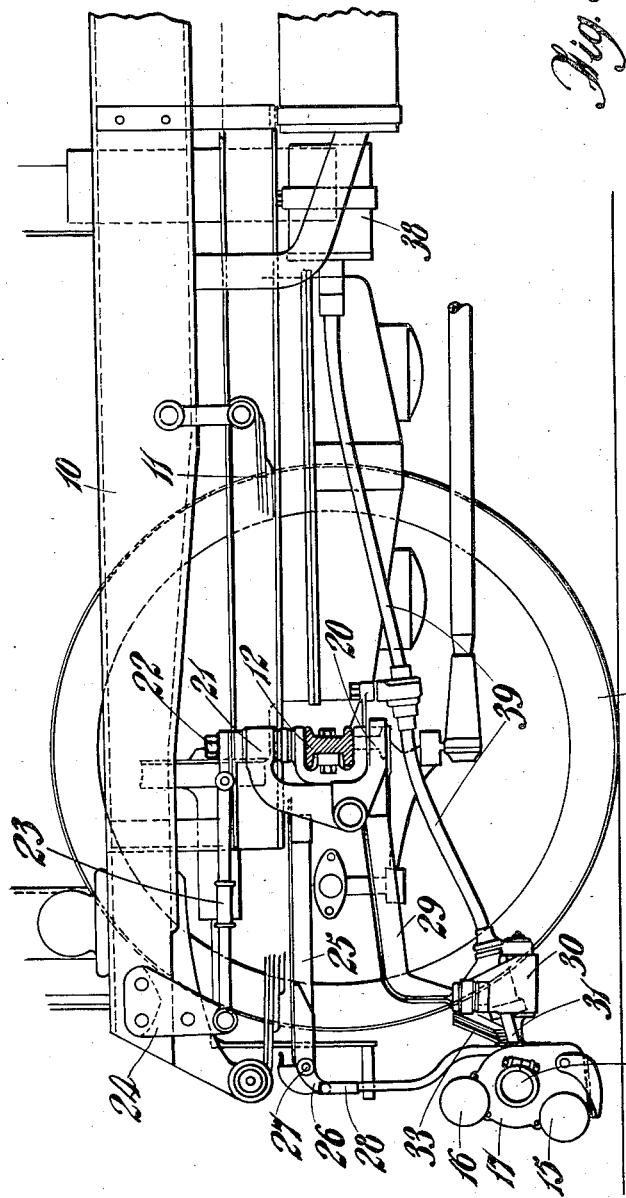
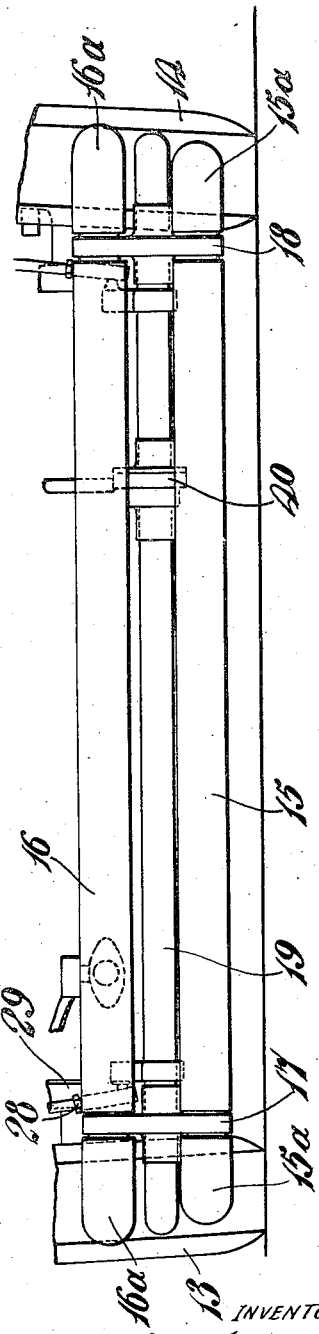
INVENTOR
V. J. Clifford
By
Attys May 12, 1936. V. J. CLIFFORD 2,040,360
LIFEGUARD FOR VEHICLES
Filed Nov. 30, 1934 4 Sheets-Sheet 2
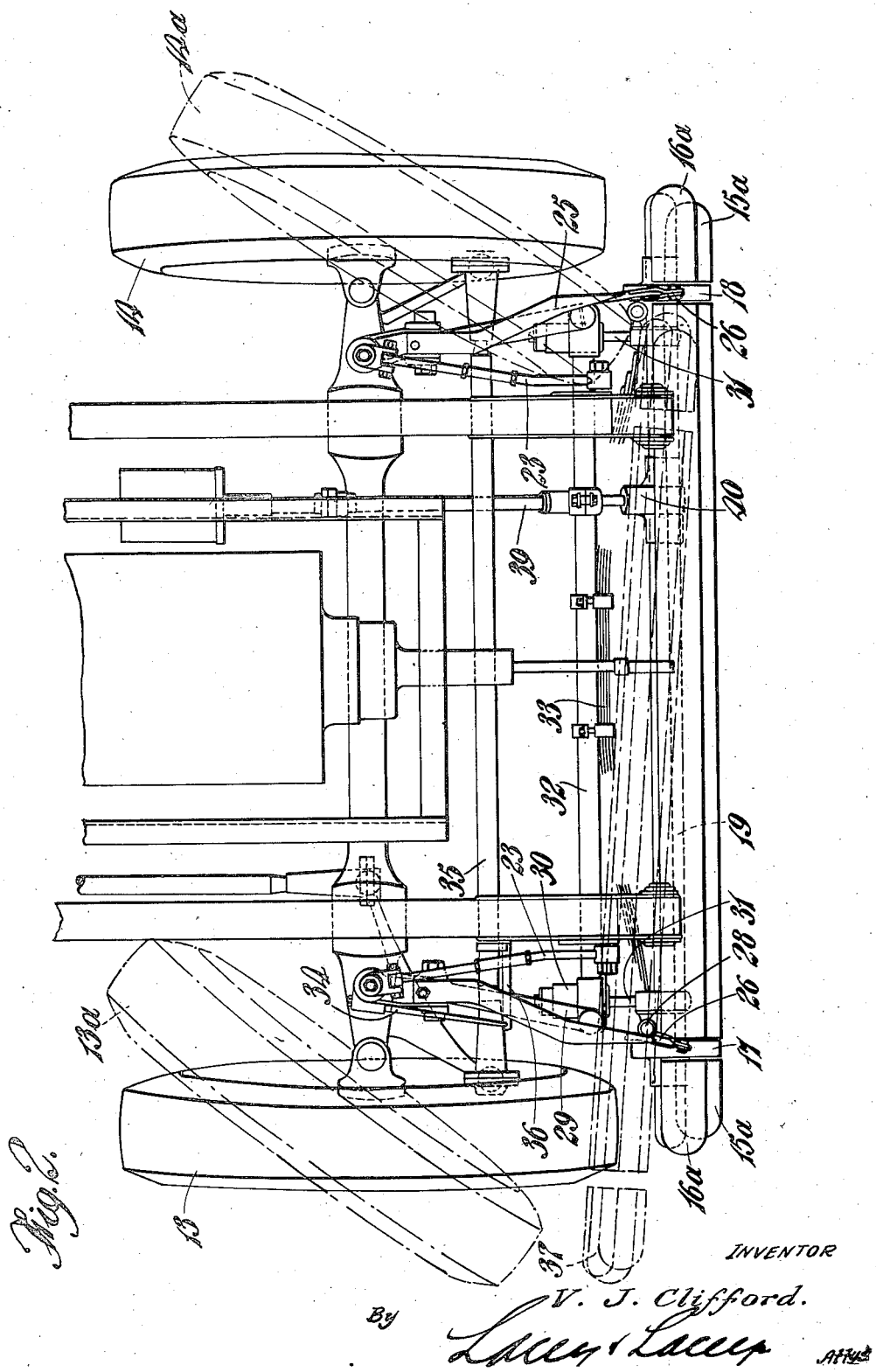
INVENTOR
V. J. Clifford.

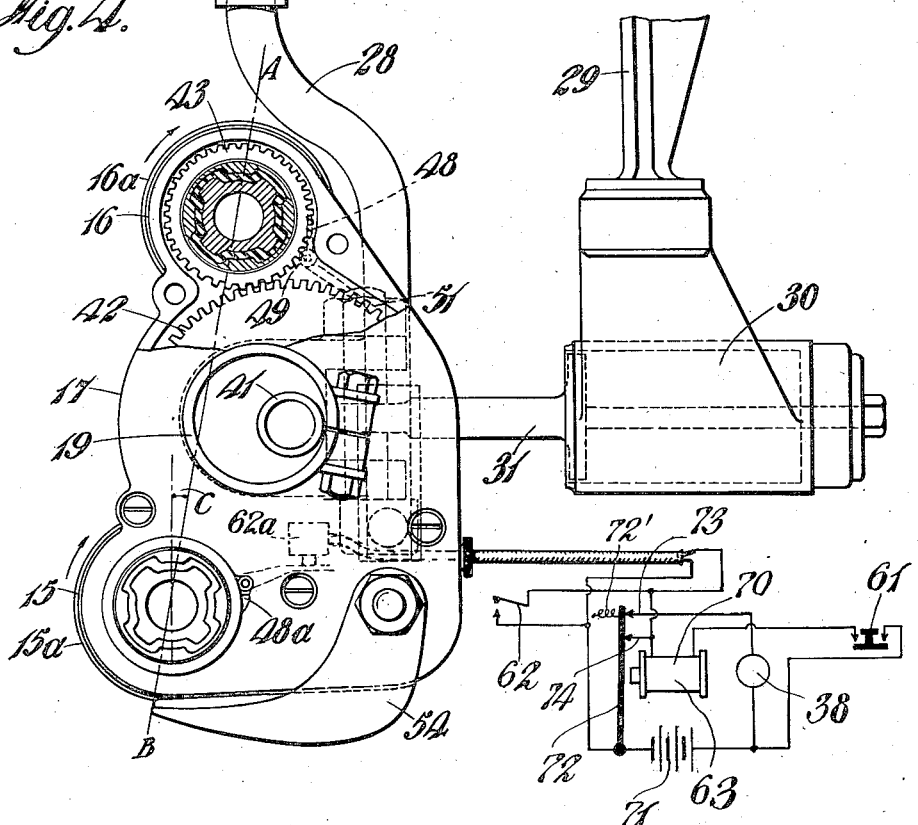

May 12, 1936. V. J. CLIFFORD 2,040,360
LIFEGUARD FOR VEHICLES
Filed Nov. 30, 1934 4 Sheets-Sheet 4
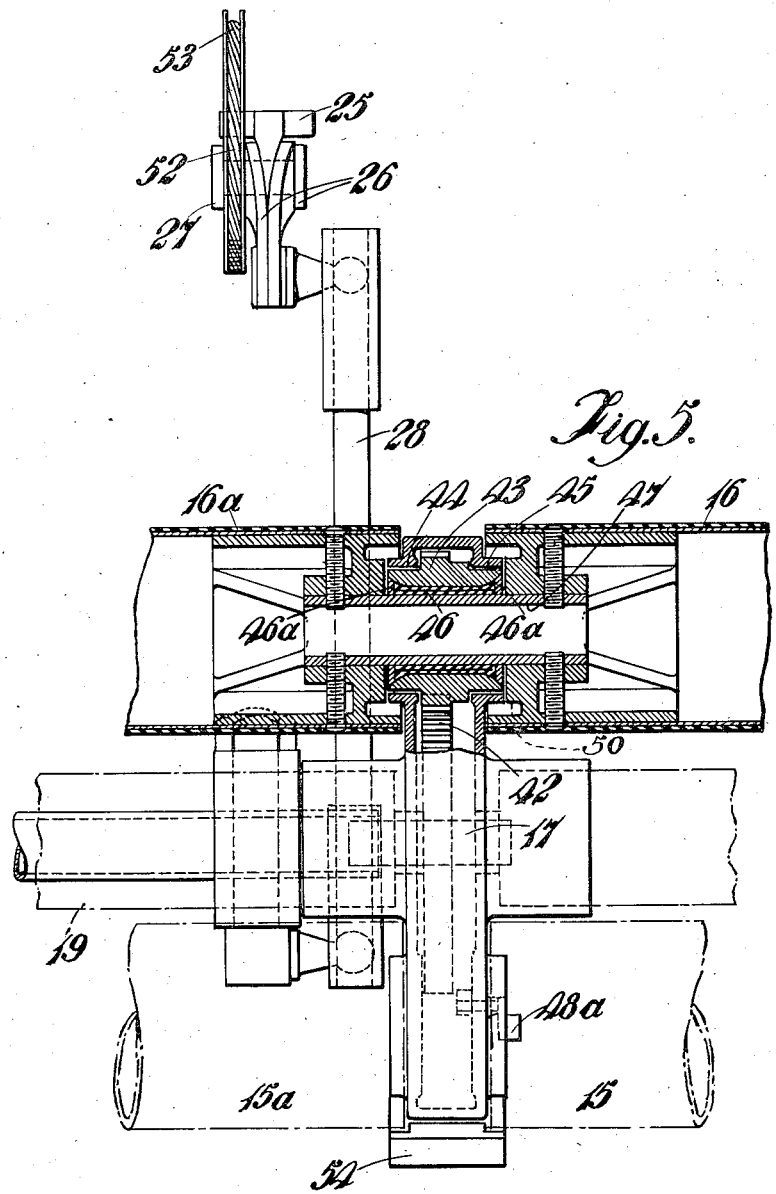
INVENTOR
V. J. Clifford.
By Lacey & Lacey,
Attys Patented May 12, 1936

2,040,360

UNITED STATES PATENT OFFICE 2,040,360

LIFEGUARD FOR VEHICLES

Vernon John Clifford, London, England, assignor to Safety Bumpers Limited, London, England, a company of Great Britain Application November 30, 1934, Serial No. 755,520
In Great Britain November 30, 1933

16 Claims. (Cl. 293—17)

This invention relates to lifeguards for road and other vehicles, and particularly to those of the kind in which a roller or the equivalent thereof carried in front of the vehicle is arranged to be rotated in the opposite direction to that of the road wheels when the roller itself or some projection comes into contact with an obstruction or when operated by the driver of the vehicle.

The invention has for its object to provide an improved form and construction of roller arrangement which is particularly adapted for comparatively close co-operation with the road surface, and which at the same time overcomes difficulties which appear to be inherent with the ordinary single form of roller construction.

In a vehicle lifeguard comprising a plurality of rollers arranged one above another in front of the vehicle and rotatable about axes extending transversely of said vehicle, according to the present invention two or more of said rollers are positively driven in a direction opposite to that of the road wheels, and this constitutes an upwardly moving screen for imparting a rolling tendency to a body disposed in front of the lifeguard. Moreover the rollers may be carried by a frame or equivalent structure maintaining them in spatial relationship, which is at all times constant excepting slight relative movement used for producing self-alignment in the bearings or for producing sensitivity. The term "sensitivity" as used herein relates to the mounting of the rollers or other parts of the life-guard, so that upon impact with a body said part or parts move rearwardly to a very slight extent relative to the vehicle and thus automatically bring into operation the means for positively driving the rollers. Preferably the rollers form a screen extending laterally across the front of the vehicle, the general plane of said screen being inclined to the vertical plane so that its upper part lies in the rear of the lower part, while the rollers, together with their supporting structure, may conveniently be pivoted to the vehicle chassis so as to follow automatically steering movements of the front wheels.

The lower roller is preferably formed with corrugations or is otherwise constructed so as to have a fairly firm engagement with the obstacle and thus impart to the latter a thrust disposed at a substantial angle to the surface of the road. On the other hand, the upper roller may be smoother or may be so constructed as to have less frictional grip so as to minimize the tendency to carry the obstacle over the top of the upper roller. By the combination of these two effects, the obstacle is rolled along the road surface with much less friction than in the case where an ordinary single roller is employed, while the cost of the installation is reduced owing to the small size which the rollers can take without affecting their efficiency. Thus, for instance, drawn steel tubing may readily be utilized for the construction of the rollers and the latter can be readily and inexpensively changed when damaged. Moreover, the use of small diameter rollers enables the working height of the lower roller to be considerably reduced, thus making the lifeguard more effectual in operation, as said lower roller is thus more "underneath" the body being rolled.

The invention is illustrated by way of example in the accompanying diagrammatic drawings in which Figure 1 is a fragmentary elevation of a motor vehicle having the improved lifeguard fitted to the front axle;

Figure 2 is a fragmentary plan corresponding to Figure 1;

Figure 3 is a front elevation of the rollers and other associated parts;

Figure 4 shows to an enlarged scale a part sectional elevation through one of the roller bearing brackets and the associated supporting means; and Figure 5 is a front sectional elevation corresponding to Figure 4.

Referring firstly to Figures 1 and 2 where the vehicle chassis is indicated at 10, the front springs at 11, the front axle at 12 and the front wheels at 13 and 14, it will be seen that the lifeguard comprises a lower roller 15 and an upper roller 16, both of which extend in front of the vehicle, and are arranged with their axes parallel. The rollers are pivotally mounted in bearing brackets 17 and 18, outside of which the rollers are provided with terminal portions 15a and 16a for protecting the wheels 13 and 14. The bearing brackets 17, which are of hollow construction and virtually form gear boxes, are connected by means of a stay tube 19 extending along the space between the rollers 15 and 16, and thus tending to form a substantially continuous screen as shown in Figure 3.

In order that the ground clearance may remain as constant as possible, the lifeguard is attached to the front axle 12 by means of a pair of C-shape brackets 20 forming the pivotal mounting for corresponding swivelling brackets 21 which are also of C-shape, the upper part of each of said brackets 21 being arranged to move about a pivot pin 22, the top end of which is supported by an articulated strut member 23 attached to the chassis by means of a bracket 24. This permits vertical rising and falling of the axle 12 in the usual way under the influence of the springs 11.

To each of the brackets 21 a forwardly directed supporting arm 25 is firmly attached, and carries at its end a link 26 which is pivoted at 27 and carries at its front extremity a depending tie 28 attached at its lower end to the corresponding bracket 17 or 18. The ties 28 and arms 25 thus bear the weight of the lifeguard unit without obstructing the fore and aft movement thereof. It will be realized that the shock usually received by the lifeguard on impact with a body and transmitted to the axle 12 will be in a substantially horizontal direction, and for withstanding this shock a rigid arm 29 is secured firmly to each of the brackets 21, and is attached at its forward end to the casing 30 of a shock absorber. The latter is in the form of a hollow cylinder fitted with a plunger rod 31 (see Figure 2) attached to the stay tube 19. The cylinder portions of the shock absorbers 30 are rigidly connected together by a lateral stay member 32, to the centre part of which is clamped a semi-elliptic laminated spring 33. The outer ends of the latter co-operate with the stay tube 19 so that on impact with a body the rollers 15 and 16, together with the brackets 17 and 18 and stay tube 19, move rearwardly thus stressing the spring 33 and compressing a series of rubber blocks (not shown) in each of the shock absorbers 30.

The lifeguard is arranged to follow the steering movements of the front wheels by pivotal movement of the arms 25 and 29 about the axis of the pin 22, and for this purpose the bracket 21 is provided with an arm 34 which is connected to the usual steering track rod 35 by means of a link 36. Thus, when the wheels occupy the positions indicated at 13a, 14a, the rollers 15 and 16 are brought to the position indicated generally at 37 in Figure 2.

For positively rotating the rollers 15 and 16, an electric motor 38 is operatively connected by means of a flexible shaft 39 with a gear box 40 for transmitting rotation to a driving spindle disposed within the stay tube 19. The construction of the driving part of the apparatus is shown more clearly in Figures 4 and 5, to which reference will now be made.

The driving spindle which is indicated at 41 carries within each of the brackets 17 or 18 a driving gear wheel 42 which meshes with a pair of driven wheels 43, one for each roller. As will be seen in Figure 5, each of the wheels 43 is mounted for rotation in a pair of bearings 44 and 45 formed in the walls of the bracket 17 or 18, and the interior of said wheel 43 is occupied by a bush 46 of rubber or other comparatively soft material, said bush serving to support and drive a tubular spindle 47 forming part of the corresponding roller 15 or 16. In order to improve the torque-transmitting capabilities of the bush 46, the interior of the wheel 43 and the exterior of the spindle 47 are splined as shown in Figure 4, and this enables a bush to be used which has sufficient softness for sensitively mounting the corresponding roller 15 or 16. Thus the moment an obstacle is struck by either of the rollers, the force of impact first presses back the roller or rollers to a slight extent relative to the corresponding wheels 43, and this movement is used for switching on the electric driving motor 38 through suitable relay mechanism indicated at 63 and having a push button resetting the switch 61. To operate this relay a switch lever 48 pivoted at 49 is arranged to rub lightly upon a concentric surface 50 upon the roller 16 and as the pivot 49 is attached to the bracket 17 any rearward movement of the roller causes that part of the lever 48 above the pivot 49 to be deflected rearwardly so that the lower tail end 51 of said lever closes momentarily an electric switch which is not itself shown in Figure 4 but the contacts of which are indicated at 62. A corresponding lever 48a is fitted in conjunction with the lower roller 15 for operating a switch 62a, the switch having contacts 62 being similar to this. The momentary closing of the switch contacts 62 or those of the switch 62a permits current to flow through a solenoid 70 of the relay 63 from a battery 71 thus causing the relay armature 72 to close against contacts 73 and 74. This immediately energizes the motor 38 driving the rollers and also short circuits the contacts 62, 62a thus maintaining the relay in an operative condition until the solenoid circuit is broken by actuation of the pushbutton resetting switch 61 and the armature 72 drawn away from the contacts 73 and 74 by a spring 72'. The actual sensitivity of the roller mounting can be adjusted by suitable selection of the soft material forming the bush 46, but can also be adjusted by the provision of washers 46a of suitable thickness for causing the desired amount of axial compression.

The lifeguard illustrated is intended to remain normally in its lowered operative position, but provision is made for raising the rollers 15 and 16 together with the associated parts, either under the control of the driver, or automatically in the event of the lifeguard encountering a sharp rise in the road or a similar obstacle. Thus, in the construction shown in Figures 4 and 5, a circumferentially grooved sector 52 is fitted to each of the links 26 and is provided with a cable 53 secured at one end to the sector 52, so that the latter together with the link 26 can be raised by applying tension to said cable. Preferably the pivot 27 works tightly or is provided with appropriate frictional means having a damping effect sufficient to stop vertical vibration of the lifeguard. For raising the latter automatically a skid member 54 conveniently formed from hardened steel or other wear-resisting material is secured to the lower part of each of the brackets 17 and is adapted to raise the lifeguard bodily upon encountering rising ground. It will be appreciated, of course, that the skids 54 can be attached to other parts of the lifeguard, for example the stay tube 19, such parts preferably being non-sensitively mounted so that the rearward impact does not have the effect of starting up the motor 38.

It will be seen from Figures 1 and 4 that the rollers 15 and 16, together with the stay tube 19, virtually form a screen, by contact with the front surface of which the body derives an upward movement tending to cause said body to be rolled along the ground. It has been found that by positively driving the upper roller 16 the efficiency of the lifeguard has been considerably increased and, by suitably selecting the surface materials of the rollers 15 and 16, a satisfactory rolling action has been obtained without any tendency for the body to rise over the upper roller 16. It has also been found desirable to arrange the upper roller slightly in the rear of the lower one, so that the plane containing the axes of these two rollers (which plane is indicated by the line A B in Figure 5) makes an angle of approximately 10° to the vertical as indicated by the angle C.

It will be seen that the invention provides an improved general form of construction, especially in so far as it allows the costs to be reduced and at the same time permits the rolling effect to be varied in several respects without departing from the usual manufacturing requirements. Moreover, the fact that the axis of the lower or lowest roller may readily be arranged in close relationship to the road surface enables the device to operate with the minimum likelihood of damage or injury to the body being rolled.

What I claim is:—

1. In a vehicle, a lifeguard comprising roller-carrying means mounted at the front of the vehicle, upper and lower rollers carried by said means and shiftable rearwardly out of a normal position, each roller extending normally at right angles to the longitudinal axis of the vehicle and parallel with the other roller, driving means for positively rotating both rollers, and means for rendering the driving means operative when rollers are shifted rearwardly by the lifeguard encountering an obstacle, the rollers being normally carried so that the lower roller is in proximity to the ground and the upper roller is positioned rearwardly of the lower roller.

2. In a vehicle, a lifeguard comprising roller-carrying means secured to the front of the vehicle, upper and lower rollers carried by said means, each roller extending normally at right angles to the longitudinal axis of the vehicle and parallel with the other roller, driving means for positively rotating both rollers, and guiding means associated with the steering mechanism of the vehicle whereby the rollers are caused to follow the steering movements, the rollers being normally carried so that the lower is in proximity to the ground while the upper roller is positioned rearwardly of the lower roller.

3. In a vehicle, a lifeguard comprising roller-carrying means secured to the front of the vehicle, upper and lower rollers carried by said means and driving means for positively rotating both rollers, said carrying means comprising a frame having a transverse tube positioned between the upper and lower rollers to serve as a guard, and the rollers being normally carried so that the lower is in proximity to the ground while the upper roller is positioned rearwardly of the lower roller.

4. In a vehicle, a lifeguard according to claim 3 having a driving shaft forming part of the driving means and carried within the transverse tube serving as a guard between the rollers.

5. In a vehicle, a lifeguard comprising roller-carrying means secured to the front of the vehicle, upper and lower rollers carried by said means, the upper roller being disposed rearwardly of the lower roller, means for positively rotating said rollers in a direction opposite to that of the road wheels, resilient bushes disposed between the rollers and the carrying means, and an electric contact device actuated by rearward movement of one of the rollers relative to the carrying device on account of the resilient bushes, and driving means independent of the road wheels and set into operation by the electric contact device.

6. In a vehicle, a lifeguard comprising roller-carrying means secured to the front of the vehicle, upper and lower rollers carried by said means, each roller extending normally at right angles to the longitudinal axis of the vehicle and parallel with the other roller, and driving means for positively rotating both rollers, said roller-carrying means comprising a suspension member for taking the weight of the lifeguard in a pendulous manner, and separate means for resisting horizontal thrust applied to the lifeguard.

7. In a vehicle, a lifeguard comprising roller-carrying means secured to the front of the vehicle, upper and lower rollers carried by said means, the upper roller being disposed just behind the lower roller and each being disposed normally at right angles to the axis of the vehicle, driving means for positively rotating both rollers, said roller-carrying means being arranged for bodily rising movement on encountering an obstacle from below, and a renewable shoe forming the bottom of the roller-carrying means and mounted in position to take the impact for raising the lifeguard.

8. A vehicle lifeguard adapted to be mounted in front of a vehicle and including supporting means, a plurality of rollers arranged one above another and rotatable about axes extending transversely of said vehicle, means for positively driving said rollers independent of the road wheels of the vehicle in a direction opposite to that of the road wheels whereby the rollers constitute an upwardly moving screen tending to impart a forward rolling motion to a body disposed in front of the life guard, and bushes of soft resilient material by which the rollers are carried resiliently for permitting the rollers to function properly despite flexing and distortion of the supporting means by which the bearings are carried.

9. A vehicle lifeguard adapted to be mounted in front of a vehicle and including supporting means, a plurality of rollers arranged one above another and rotatable about axes extending transversely of said vehicle, means for positively driving said rollers independent of the road wheels of the vehicle in a direction opposite to that of the road wheels whereby the rollers constitute an upwardly moving screen tending to impart a forward rolling motion to a body disposed in front of the life guard, and a stay member forming part of the supporting structure for the rollers and occupying space between the rollers, said stay member being in the form of a tube which accommodates a common driving shaft by which the rollers are positively rotated.

10. A vehicle lifeguard as claimed in claim 8 including means for controlling the operation of the driving means, said controlling means being actuated by rearward movement of the rollers when the latter encounter an obstacle, said rearward movement being permitted relative to the supporting means by the resilient bushes of soft resilient material.

11. A vehicle lifeguard adapted to be mounted in front of a vehicle and including supporting means, a plurality of rollers arranged one above another and rotatable about axes extending transversely of said vehicle, means for positively driving said rollers independent of the road wheels of the vehicle in a direction opposite to that of the road wheels whereby the rollers constitute an upwardly moving screen tending to impart a forward rolling motion to a body disposed in front of the lifeguard, the rollers, together with the structure by which they are maintained in permanent relationship, being mounted resiliently for movement in the fore and aft direction so as to absorb excessive shocks upon encountering a body.

12. A vehicle lifeguard adapted to be mounted in front of a vehicle and including supporting means, a plurality of rollers arranged one above another and rotatable about axes extending transversely of said vehicle, means for positively driving said rollers independent of the road wheels of the vehicle in a direction opposite to that of the road wheels whereby the rollers constitute an upwardly moving screen tending to impart a forward rolling motion to a body disposed in front of the lifeguard, a driving spindle extending parallel with the rollers, gears for transmitting rotary motion from said spindle to said rollers, and resilient means interposed between the rollers and the gears carried thereby.

13. A vehicle lifeguard comprising in combination a plurality of positively driven rollers disposed substantially horizontally in front of the vehicle, a frame structure supporting said rollers, suspension means carrying the frame structure in a pendulous manner, abutment means resisting rearward displacement of the frame structure, and resilient means interposed between said frame structure and the abutment means, a resilient mounting for said frame structure, and restraining mechanism for supporting said structure, said restraining mechanism comprising at each end of the life guard a member adapted to bear the weight of the rollers and frame structure and a member for taking the substantially horizontal shock on impact with a body.

14. A vehicle lifeguard as claimed in claim 13, in which the resilient means disposed between the frame structure and the abutment means comprises a semi-elliptic spring.

15. A vehicle lifeguard adapted to be mounted in front of a vehicle and including supporting means, a plurality of rollers arranged one above another and rotatable about axes extending transversely of said vehicle, and means for positively driving said rollers independent of the road wheels of the vehicle in a direction opposite to that of the road wheels whereby the rollers constitute an upwardly moving screen tending to impart a forward rolling motion to a body disposed in front of the life guard, said driving means including a driving member for each roller mounted in bearings upon a frame structure, the driving member being formed with an axial hole containing a bush of soft material fitting about a spindle forming part of the roller.

16. A vehicle life guard as claimed in claim 15, wherein the interior of each driving member and the exterior of the companion spindle are non-circular in cross section to correspondingly shape the bush and prevent independent rotation of the roller and drive member.

VERNON J. CLIFFORD.